Figure 1:
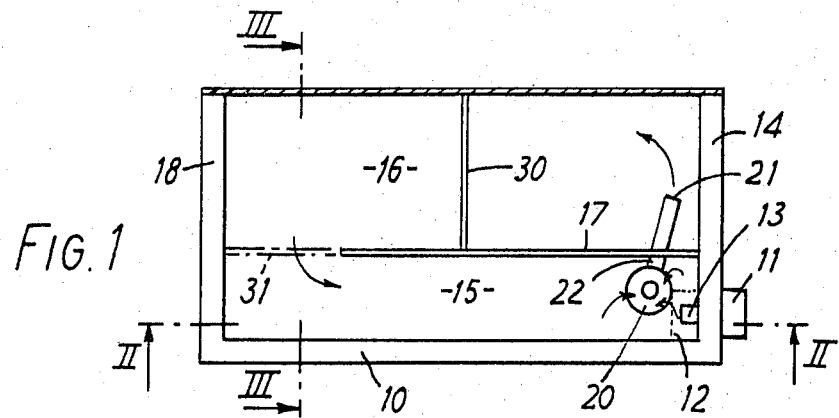

United States Patent [19] [11] 4,295,866
Kearny [45] Oct. 20, 1981

| | | | |
|---|---|---|---|
| [54] | PAINT SPRAY BOOTH WITH WATER WASH | | |
| [76] | Inventor: | Thomas J. Kearny, 8 Oaklands, Green Lane, Malvern Wells, Worcester, England | |
| [21] | Appl. No.: | 46,475 | |
| [22] | PCT Filed: | Oct. 11, 1978 | |
| [86] | PCT No.: | PCT/GB78/00022 | |
| | § 371 Date: | Jun. 7, 1979 | |
| | § 102(e) Date: | Jun. 7, 1979 | |
| [87] | PCT Pub. No.: | WO79/00209 | |
| | PCT Pub. Date: Apr. 19, 1979 | | |
| [51] | Int. Cl.³ ............................................. B01D 47/06 | | |
| [52] | U.S. Cl. ....................................... 55/228; 55/240; 98/115 SB; 210/195.1; 210/523 | | |
| [58] | Field of Search ................. 55/228, 238, 240, 241; 98/115 R, 115 SB; 210/70, 84, 195.2, 523; 261/3, 112 | | |

[56] References Cited

U.S. PATENT DOCUMENTS

| 2,337,983 | 12/1943 | Fisher ......................... 98/115 SB X |
|---|---|---|
| 2,536,998 | 1/1951 | Newcomb et al. ................ 55/241 X |
| 2,873,816 | 2/1959 | Umbricht et al. ................ 55/241 X |
| 2,981,525 | 4/1961 | Umbricht ................. 261/3 |
| 3,173,879 | 3/1965 | Arnold et al. .............. 98/115 SB X |
| 3,341,016 | 9/1967 | Paasche .......................... 55/240 X |
| 3,876,399 | 4/1975 | Saponaro .............................. 55/228 |
| 4,096,066 | 6/1978 | Kearney ...................... 98/115 SB X |

FOREIGN PATENT DOCUMENTS

| 2310161 | 12/1976 | France . |
|---|---|---|
| 2323299 | 4/1977 | France . |
| 828779 | 2/1960 | United Kingdom . |
| 1309737 | 3/1973 | United Kingdom . |

Primary Examiner—Robert H. Spitzer
Attorney, Agent, or Firm—Robert F. O'Connell

[57] ABSTRACT

A spray booth installation has a water tank 10 from which water is withdrawn by a pump 11 to feed a water curtain covering a wall located above a dividing baffle plate 17 in the tank and to feed sprays in an air extraction passage disposed above a region 16 of the tank. A surface-removal device 20 including a venturi pump keeps the water surface clear of paint in the vicinity of the pump inlet 13 and ejects the floating paint on the other side of the baffle plate 17. A surface baffle 30 retains floating material while allowing water to circulate back to the front region 15.

10 Claims, 6 Drawing Figures

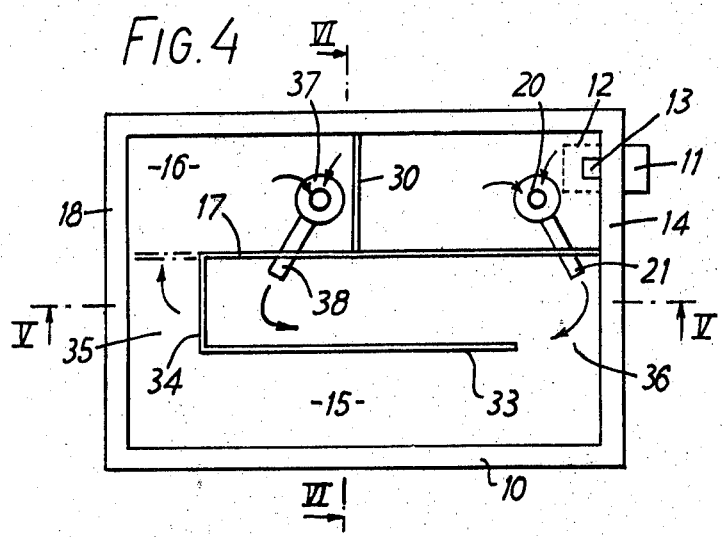
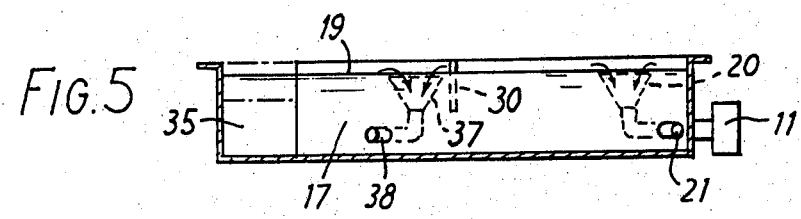
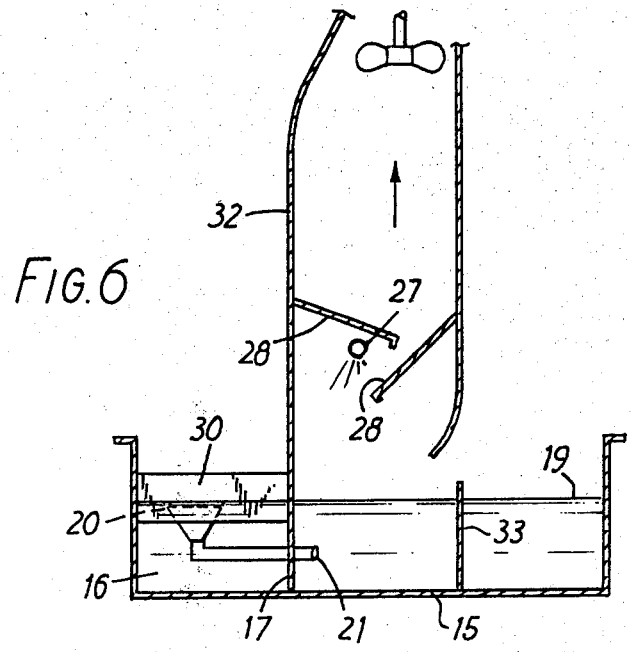

PAINT SPRAY BOOTH WITH WATER WASH

The present invention relates to a paint spray booth installation including a water tank from which water is withdrawn by a pump to wash sprayed paint from the booth and carry it into the tank.

In paint spraying booths it is conventional to provide an air extraction system by which air from the booth, which contains finely divided paint particles, is extracted and cleaned before being exhausted to atmosphere. The cleaning is often effected by the scrubbing action of water sprays or by passing the air through a water curtain. In many cases, there is also a water curtain covering the rear wall of the booth on which the overspray is received. All of these functions of the booth are dependent on a pump or some other means to supply a full continuous quantity of water. This is difficult since the pump and other means of water supply are liable to blockage because of the adhesive nature and coagulating qualities of paint in water. This is further complicated because in certain conditions, some paints are sinkable, while others are not. This has made it extremely difficult to design a system to cover both needs. These difficulties are well known in the industry.

While in many cases the water tank in which the paint is collected and from which wash water is withdrawn is located below the rear part of the booth in which the spraying takes place, so that the paint and the wash water fall directly into the tank, it is also possible for the tank to be remote from the spray booth with the paint-laden water flowing from the booth into the tank.

In accordance with the present invention there is provided a paint spray booth installation including a water tank from which water is withdrawn by a pump to wash sprayed paint from the booth and carry it into the tank, wherein the tank is divided into two communicating regions by a baffle plate extending from an end wall of the tank over a major part of the width of the tank and from the bottom of the tank to a height sufficient to break the surface of the water, the inlet to the pump is located near the said one end wall, a surface-removal device is located close to the pump inlet and is arranged to transfer floating paint from the vicinity of the pump inlet to the opposite side of the baffle plate, and a surface baffle extending between the baffle plate and a wall of the tank is arranged in one of the said regions of the tank to divide the water surface into two areas while allowing free flow below the surface baffle.

In this way the vicinity of the pump inlet is kept clear of floating paint both by removal of paint arriving in the vicinity and by use of the surface baffle to confine floating paint in a region away from the pump. This enables the pump to be protected against blockage without the use of expensive and cumbersome filtration equipment, which has proved unsuccessful in the past.

Preferably the surface-removal device is a venturi unit such as is described in my U.K. Pat. No. 1,309,737 which serves also to disperse the floating paint in the wash water, leading to breakdown of the paint and settling-out of the heavier constituents which then accumulate at the bottom of the tank.

Figure 2:
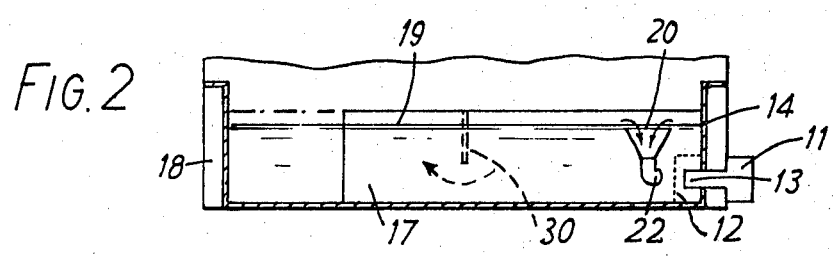
Figure 3:
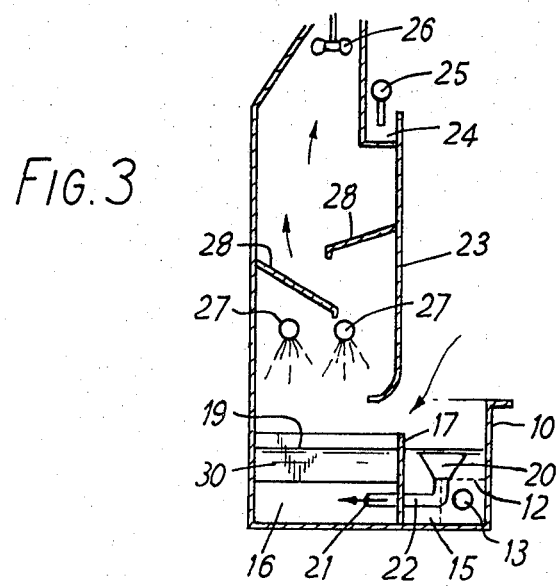

The invention will be described in more detail with the aid of examples illustrated in the accompanying drawings, in which:

FIG. 1 is a plan view of the water tank of a paint spray booth installation in accordance with the invention, FIG. 2 is a section on the line II—II of FIG. 1, FIG. 3 is a vertical section of the rear part of the booth on the line III—III of FIG. 1, FIG. 4 is a plan view of the water tank of a second embodiment of the invention, FIG. 5 is a section on the line V—V of FIG. 4, and FIG. 6 is a vertical section of the booth on the line VI—VI of FIG. 4.

FIG. 1 shows a rectangular tank 10 having a pump 11 for extracting water for washing through a simple mesh strainer 12. The pump inlet 13 is disposed in a side wall 14 in the forward part 15 of the tank and the forward part 15 is divided from the rear part 16 by a baffle plate 17. The baffle plate 17 extends from the end wall 14 over the major part of the width of the tank but leaves open a region adjacent the opposite side wall 18 for communication between the forward and rear parts 15 and 16. The height of the baffle plate 17 is such as to extend from the bottom of the tank to a level above the normal water level 19. A venturi unit 20 of the type described in my U.K. Pat. No. 1,309,737 is mounted adjacent the inlet 13 of the pump 11 to remove floating paint from the water surface and eject it from an outlet 21 which lies below the water surface in the rear part 16 of the tank and is connected to the venturi unit by a pipe 22 passing through the baffle plate 17. The necessary motive fluid for operation of the venturi unit 20 can be supplied from the pump 11 by piping which is omitted from the drawing in the interests of clarity. The venturi unit 20 is itself only shown schematically.

It can be seen in FIG. 3 that in conventional manner the spray booth has a back wall 23 disposed above the baffle plate 17 and covered by a water curtain falling from a trough 24 supplied by nozzles 25. Air is extracted from the booth by a fan 26 and passes under the lower edge of the back wall 23 and thus through the water curtain. Further washing of the air is effected by means of spray nozzles 27 and inclined plates 28 allow for run-back of water settling out of the air stream. Thus sprayed paint which does not fall on the article to be painted is either washed down by the water curtain over the back wall 23 or extracted with the air from the booth and then washed out of the air stream to fall back into the rear part of the tank. There is in consequence a build up of paint in the water in the tank and some of this floats on the surface. However the venturi unit 20 removes floating paint from the vicinity of the pump inlet 13 and this minimizes the risk of blocking of the inlet and of the pump itself with paint.

The venturi unit also has the function of dispersing the paint so that the heavier constituents separate out and settle at the bottom of the tank, thus reducing the volume of scum floating on the surface. A circulation is set up in the tank from the outlet 21 of the venturi unit 20 along the rear part 16 of the tank towards the side wall 18, through the gap left by the baffle plate 17, and back along the forward part 15 of the tank towards the venturi unit 20 and the side wall 14. However a surface baffle 30 is mounted between the baffle plate 17 and the back wall of the tank, across the rear part 16 of the tank and this surface baffle prevents floating material taking part in the circulation just described. Thus material which remains floating after treatment by the venturi unit accumulates in the region defined between the side wall 14 and the surface baffle 30 in the rear part of the tank. Since the surface baffle 30 only breaks the surface of the water and extends to a limited depth below the surface circulation of the water continues below the surface baffle.

A second surface baffle 31 may optionally be arranged as an extension of the baffle plate so that the other half of the rear part 16 can be used to trap floating material.

The floating bodies trapped in the region between the side wall 14 and the surface baffle 30 are subjected to several forces. The venturi unit 20 causes great movement and turbulence in this area and it may be made to diffuse a continuous stream of air bubbles which assist the large particles to maintain a floating position. At the same time, the surface is subjected to strong cross draughts from the extract air and also from the returning cascade of water from the water curtain and the sprays 27. These agitations cause the floating paint, which cannot easily escape from the area, to be reduced to a smaller size which then passes safely through the system with no danger to the pump. When finally relieved of their floatation components, the solids sink to the tank base. Paint or other floating bodies which cannot be reduced in this way, may be removed from the surface as and when necessary.

In the embodiment of FIGS. 4 to 6 the tank 10 is again divided by a baffle plate 17 into front and rear parts 15 and 16. In this case however the baffle plate 17 is part of a vertical wall 32 (FIG. 6) which forms the rear wall of the an air-extraction passage whose opposite wall is defined by the wall 23 over which the water curtain falls. Within the air-extraction passage there are water sprays 27 and baffles 28 as before. Thus air which is extracted from the booth beneath the wall 23 and passes through the water curtain is additionally washed by the sprays 27 and agitation of the water surface is created in front of the baffle plate 17.

The front part 15 of the tank contains a baffle plate 33 extending parallel to the baffle plate 17 and disposed beneath the wall 23. The baffle plate 33 is joined to the baffle plate 17 by a further plate 34 leaving a gap 35 between the plate 34 and the side wall 18 through which there is free communication between the front and rear parts 15 and 16 of the tank. However the region of the tank between the baffle plates 17 and 33 only communicates with the region forward of the baffle plate 33 by way of a gap 36 adjacent the side wall 14.

In this case the inlet 13 of the pump 11 is disposed in the side wall 14 but in the rear part 16 of the tank. The venturi unit 20 is also in the rear part of the tank and has its outlet 21 in the forward part 15 so that the circulation of the water is in the opposite sense to that in the embodiment of FIGS. 1 to 3. In this instance the surface baffle 30 restricts access of floating paint to the venturi unit 20. Furthermore a second venturi unit 37 is positioned upstream of the surface baffle 30 to remove floating paint which might otherwise tend to accumulate in this region as a result of the water circulation in the tank. The venturi unit 37, like the unit 20, has an outlet pipe 38 extending through the baffle plate 17 into the part 15 of the tank.

The outlet pipe 38 opens into the region between the baffle plates 17 and 33 from which there is set up a circulating flow by way of the gaps 36 and 35 into the rear part 16 of the tank. In the region between the baffle plates 17 and 33 the paint is subjected to agitation due to the water curtain and the water sprays. This is similar to the agitation which occurs in the region between the side wall 14 and the surface baffle 30 in the embodiment of FIGS. 1 to 3.

Whereas in the embodiments described the water tank is immediately beneath the paint spray booth, the invention may also be applied to a tank which is remote from the spraying area and receives water loaded with paint from a collecting tray or tank below the booth.

In the embodiments described the venturi unit 20 serves as a surface removal device which transfer floating paint to the opposite side of a baffle plate. The floating paint runs over a weir formed by the edge of a collecting chamber and the motive fluid from the pump 11, acting through a venturi pump, draws the collected material out of the collecting chamber and ejects it from the outlet 21. In an alternative form of surface removal device the venturi pump may be replaced by a rotary vane pump.

I claim:

1. A paint spray booth installation comprising
a water tank,
pump means for withdrawing water from the tank,
a washing system for washing sprayed paint from the booth into the tank, said pump means feeding water to said washing system,
a baffle plate dividing the tank into two communicating regions, said baffle plate extending from one end wall of the tank over a major part of the width of the tank and from the bottom of the tank to a height sufficient to break the surface of the water,
an inlet for said pump means located near the said end wall in a first of said regions,
a surface removal device located close to the pump inlet and arranged to transfer floating paint from the vicinity of the pump inlet into the second of the said regions, the water in the second region being subject to agitation by water falling onto the surface from said washing system, and
a surface baffle extending between the baffle plate and a wall of the tank and arranged to hold back floating material while allowing free circulation below the surface baffle away from the second region towards the pump inlet.

2. An installation as claimed in claim 1 in which said washing system includes air-washing sprays arranged above the second region so that the water from these sprays falls onto the water surface in the second region.

3. An installation as claimed in claim 1 having a back plate and means for creating a water curtain over the back plate, the back plate being so arranged that water from the curtain falls onto the water surface in the second region.

4. An installation as claimed in claim 3 comprising means for withdrawing air from the booth under the back plate and thereby drawing water from the curtain under the back plate.

5. An installation as claimed in claim 1 in which the surface baffle is in the said second region.

6. An installation as claimed in claim 1 in which the surface baffle is in the first region and a second surface removal device is arranged in the first region on the opposite side of the surface baffle to the first surface removal device, said second device being arranged to transfer floating paint from the first region to the second region.

7. An installation as claimed in claim 6 in which the second region has a second baffle plate parallel to the first baffle plate and joined to the free end of the first baffle plate by a third baffle plate.

8. An installation as claimed in claim 1 having a second surface baffle arranged as an extension of the baffle plate up to the other end wall of the tank.

9. An installation as claimed in claim 1 in which the surface removal device delivers the removed material into the second region below the water surface.

10. An installation as claimed in claim 1 in which the surface-removal device is a venturi device having a collecting chamber into which the surface of the liquid flows and a venturi pump for withdrawing material from the collecting chamber.

* * * * *

UNITED STATES PATENT AND TRADEMARK OFFICE
CERTIFICATE OF CORRECTION

PATENT NO. : 4,295,866
DATED : October 20, 1981
INVENTOR(S) : Thomas John Kearney It is certified that error appears in the above-identified patent and that said Letters Patent are hereby corrected as shown below:

On the Title page, item [76], change the spelling of the inventor's name to --Thomas John Kearney--.

Signed and Sealed this

First Day of June 1982

[SEAL]

Attest:

GERALD J. MOSSINGHOFF

*Attesting Officer*     *Commissioner of Patents and Trademarks*